L. A. ASPINWALL.
AGRICULTURAL IMPLEMENT.
APPLICATION FILED JUNE 1, 1911.
1,012,118.
Patented Dec. 19, 1911.
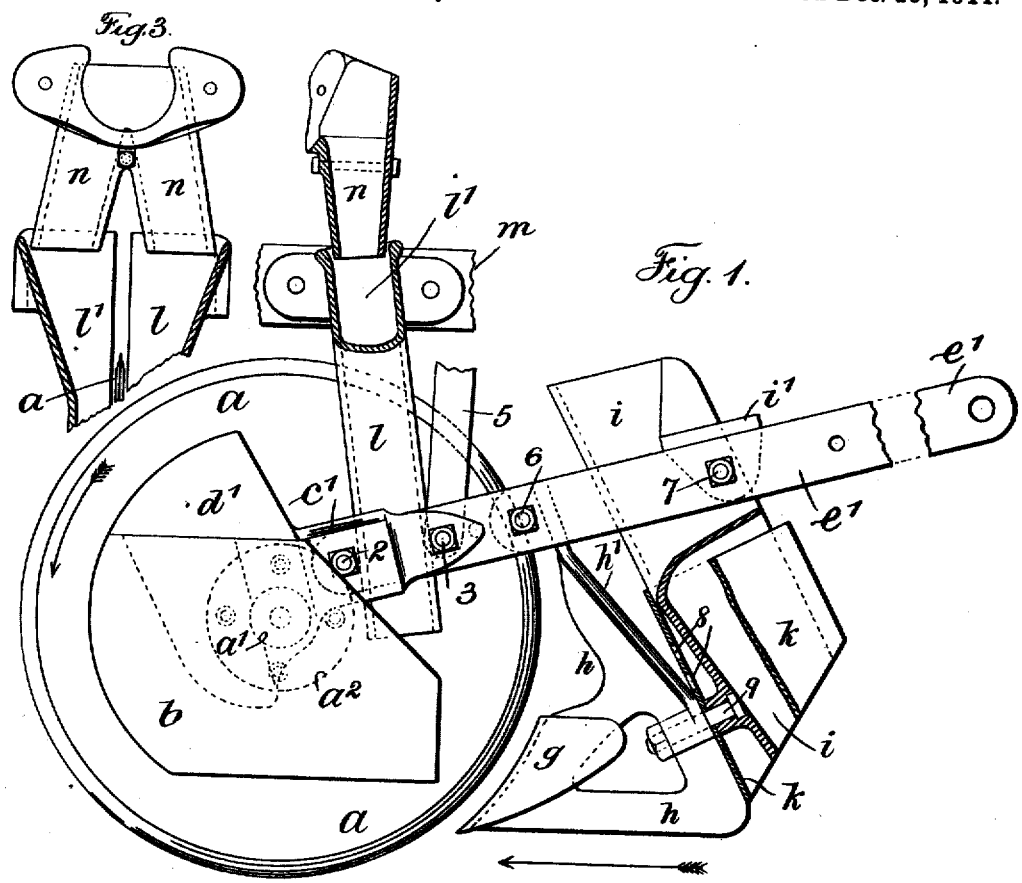
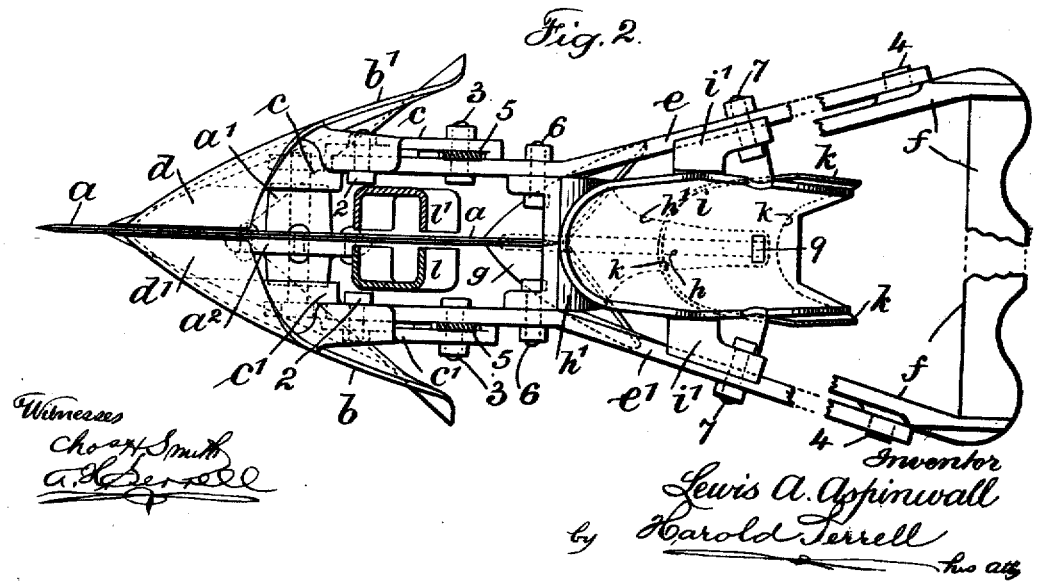

UNITED STATES PATENT OFFICE.

LEWIS AUGUSTUS ASPINWALL, OF JACKSON, MICHIGAN, ASSIGNOR TO ASPINWALL MANUFACTURING COMPANY, OF JACKSON, MICHIGAN, A CORPORATION OF MICHIGAN.

AGRICULTURAL IMPLEMENT.

1,012,118.   Specification of Letters Patent.   Patented Dec. 19, 1911.

Application filed June 1, 1911. Serial No. 630,633.

*To all whom it may concern:*

Be it known that I, LEWIS AUGUSTUS ASPINWALL, a citizen of the United States, residing at Jackson, in the county of Jackson and State of Michigan, have invented an Improvement in Agricultural Implements, of which the following is a specification.

My improvement in agricultural implements relates particularly to devices for opening furrows and mixing and delivering fertilizers, and the devices of my improvement are especially adapted for use with and are improvements upon machines shown and described in Letters Patent of the United States granted to me November 13, 1894, No. 529,099; September 25, 1900, No. 658,562; September 23, 1902, No. 709,660, and August 27, 1907, No. 864,595.

The device of my invention is designed for opening deep furrows and mixing large quantities of fertilizing material with the soil in the bottom of a trench, and the same is especiallly applicable in potato planting, but the device of my invention may also be used for the drilling of various seeds and cereals with or without the simultaneous application of fertilizer in the trench.

In carrying out my invention, I employ a central disk-wheel cutter with furrower mold-boards at the respective sides thereof; also a mixing plow working in the trench made by the mold-boards and at a lower plane or level, devices for delivering fertilizer into the trench behind the mold-boards, and a seed or potato-chute with an adjustable steel-shoe for delivering the seed or potato cuttings and regulating the depth to which the seed or potato cuttings are planted and which latter chute is placed back of the mixing plow. I further employ side-bars adapted for connection with the main frame of the planter or other agricultural implement with which the device of my invention is associated and to these are connected cast members which support the mold-boards and form the bearings for the disk-wheel cutter, and the upper parts of these cast members are continued above the mold-boards as shields to throw off loose dirt and prevent it getting inside and between adjacent parts. The side-bars also form supports for a cast standard to the front of which the mixing plow is connected, while the seed or potato chute is connected to the rear of the same.

Fertilizer is preferably delivered by spouts placed behind the mold-boards into the trench made thereby and at either side of the disk-wheel cutter; said material coming through a suitable distributing mechanism, all of which is hereinafter more particularly described.

In the drawing Figure 1 is a side elevation and partial section of the parts which constitute the essential features of my invention. Fig. 2 is a plan of the same showing at the same time a portion of the main frame of the agricultural implement to which the side-bars are securely connected. Fig. 3 is an elevation and vertical section of the fertilizer spouts shown in Fig. 1.

$a$ represents a central disk-wheel cutter which comprises a plate of circular form with a sharpened periphery. This is advantageously made with a central opening of a size to pass over the hub $a^1$ and against a flange $a^2$ to which it is securely riveted; said flange by preference being part of the hub and the said hub is provided with an axle which is mounted in openings forming bearings therefor in the cast members $c$ $c^1$.

I provide furrower mold-boards $b$ $b^1$ and these are located at either side of the disk-wheel cutter $a$ and bear substantially the same relation thereto as shown in the drawing. These mold-boards are securely fastened to the said cast members $c$ $c^1$ and the rear ends of said mold-boards are out-turned as shown in Fig. 2 so as to more effectually throw off the earth in forming the furrow.

I provide shields $d$ $d^1$ formed with the cast members $c$ $c^1$ and extending above the furrower mold-boards $b$ $b^1$; there being by preference off-set edges to the shields $d$ $d^1$ at their union with the cast members $c$ $c^1$ so that the off-set portions come above and along the line of the upper edges of the mold-boards. These shields approach one another as they rise above the mold-boards and approach one another along their advancing edges and act to throw off or prevent any overflow of earth above the mold-boards into the bearing of the disk-wheel cutter. I further provide side-bars $e$ $e^1$ which are connected to the cast members $c$ $c^1$ by bolts 2 at off-set portions of said castings which receive the free ends of the side-bars and also by the bolts 3; the free ends of the cast members $c$ $c^1$ having returned portions which bear against the outer faces of the side-bars $e\ e^1$ at the bolts 3 so as to leave openings into which are placed the lifter-bars 5; the bolts 3 at the same time forming bearings for the lifter-bars. These lifter-bars are substantially the same and perform substantially the same office as is performed by the lifter-bars $i$ in my Patent No. 658,562; the purpose being to raise the plow and parts connected with the side-bars to a level above the ground when not in use so that the implement may be moved from place to place on its wheels without the devices thereof for opening the soil coming in contact with the surface of the earth over which the implement is moved. I have shown particularly in Fig. 2, part of a frame $f$ which also substantially agrees with a similar frame shown in my Patent No. 658,562 and which is provided with trunnions similar or substantially the same as the trunnions 4 shown herein and which receive the free ends of the side-bars $e\ e^1$.

$g$ represents a mixing plow secured to a cast standard $h$. The lower portion of this standard is like a vertically disposed rib with a broad flaring top portion $h^1$. This in part stiffens the cast standard and the same at the upper forward portion is provided to come between substantially parallel parts of the side-bars $e\ e^1$ with parallel meeting faces; the parts being securely fastened together by bolts 6. Therefore while the side-bars form supports for the cast standard and the mixing plow connected therewith, the upper part of said cast standard spaces the side-bars apart and securely fastens them at one end of a frame, as it were, the other end of which is the cast members $c\ c^1$ and the arbor of the disk-wheel cutter $a$.

It will be noticed that the lower edge of the cast standard and the lower point of the mixing plow are on a level or plane below the lower edge of the mold-boards; therefore in the operation of the machine the central disk-wheel cutter which is employed for cutting soil and cutting through rubbish and stubble and coarse manure in the field and cutting through the earth to form a true line of direction for the running of the agricultural implement comes below both the mold-boards $b\ b^1$ and the mixing plow and that while the mold-boards at their lower edge determine the depth of the furrow, the mixing plow coming below the level of the mold-boards cuts into and disturbs the earth to a lower level or plane, loosening the same up and consequently mixing fertilizer with the earth.

$i$ represents an upper spout formed with shoulders $i^1$ adapted to rest upon the side-bars $e\ e^1$ and to be secured thereto by the bolts 7; hence the upper spout is not only located and held in position for support but it also connects the side-bars $e\ e^1$ between the bolts 6 and the free ends of said side-bars which are connected to the trunnions 4 forming a very rigid structure. Particularly from Fig. 1 it will be noticed that the spout $i$ and the rear portion of the cast standard $h$ are formed with tubular hub portions for the connecting bolt 9 and with this spout I employ a lower adjustable shoe $k$ of the same general outline as the upper spout $i$, extending around or over the same and provided with holes 8 through one of which at a time the bolt 9 passes in connecting the upper spout and shoe securely to the cast standard $h$.

Should it be desired to lower the shoe $k$, this may be accomplished by removing the bolt 9, dropping the shoe $k$ so as to bring the next bolt hole into line and then replacing the bolt 9 and securing the same. This shoe regulates the depth of planting the seed or potatoes. There are shown three holes for the said shoe $k$ which provide for its adjustable relation to the fixed upper spout and it will therefore appear that for the strength of the structure the cast standard $h$ and the spout $i$ and shoe $k$ are not only secured together, but both secured to the side-bars $e\ e^1$.

I have shown and prefer to employ spouts $l\ l^1$ coming at either side of the central disk-wheel cutter $a$ and connected to and supported by a member $m$ such as the pole of the agricultural implement, and $n$ represents the divided spout of a suitable fertilizer distributer such as that shown in my Patent No. 529,099; the fertilizer falling from a suitable hopper through the suitable distributer down the divided spout $n$ and the spouts $l\ l^1$ at each side of the disk-wheel cutter into the furrow formed by the mold-boards $b\ b^1$ so that the action is substantially simultaneous in delivering fertilizer in this manner and in mixing the fertilizer up with the earth at the bottom of the furrow by the mixing plow $g$. This mixing plow also permits a certain amount of the side earth thereafter to fall back in the furrow and cover the fertilizer substantially simultaneous with the delivery of the seeds, cereals or potato cuttings to be planted into the furrow.

It is common in agricultural implements and in this machine of my invention, to employ coverers such as I have shown in my Patents Nos. 658,562 and 864,595 for moving in toward the center of the furrow the earth and covering up potatoes and the seed to the desired depth.

I claim as my invention:

1. In an agricultural implement, a central disk-wheel cutter, a hub and arbor therefor, cast members forming bearings for the said disk-wheel cutter and side-bars to which said cast members are secured, mold-boards secured to said cast members and coming at opposite sides of the disk-wheel cutter, a mixing plow and cast standard therefor also connected to said side-bars and arranged behind the disk-wheel cutter and the mold-boards and coming to a lower plane or level than said mold-boards, and a chute device also connected to said side-bars and coming to the rear of said mixing plow and its cast standard for delivering seeds or potatoes to the furrow to be planted.

2. In an agricultural implement, a central disk-wheel cutter, a hub and arbor therefor, cast members forming bearings for the said disk-wheel cutter and side-bars to which said cast members are secured, mold-boards secured to said cast members and coming at opposite sides of the disk-wheel cutter, and shoulders formed as upward forward prolongations of the cast members coming above the mold-boards and acting to prevent any overflow of earth above the mold-boards, a mixing plow and cast standard therefor also connected to said side-bars and arranged behind the disk-wheel cutter and the mold-boards and coming to a lower plane or level than said mold-boards, and a chute device also connected to said side-bars and coming to the rear of said mixing plow and its cast standard for delivering seeds or potatoes to the furrow to be planted.

3. In an agricultural implement the combination with a mixing plow, of a cast standard therefor of parallel sided construction with an integral broadened back and top portion, side-bars to which the top portion is secured, an upper spout for the delivery of seed, cereals or potatoes in the furrow, shoulders formed with said spout and resting upon said side-bars and secured thereto, and the lower part of the upper spout and the rear portion of the cast standard formed with alining hubs, a bolt to pass through said hubs, a lower adjustable shoe coming outside of the aforesaid spout and between the same and the back of said standard and having a series of holes through one of which at a time said bolt is adapted to pass in connecting said parts together.

4. In an agricultural implement the combination with a central disk-wheel cutter, a hub and arbor therefor and suitable supports in which the same are mounted, of furrower mold-boards coming at each side of said disk-wheel cutter and secured to said supports, spouts for fertilizer coming at either side of said disk-wheel cutter rearward of the mold-boards, a divided spout above the aforesaid spouts adapted to receive fertilizer from a suitable distributer so as to deliver the same in a furrow made by the mold-boards and at either side of the disk-wheel cutter.

5. In an agricultural implement the combination with a central disk-wheel cutter, a hub and arbor therefor, and suitable supports in which the same are mounted, of furrower mold-boards coming at each side of said disk-wheel cutter and secured to said supports, said supports or cast members being continued above the mold-boards and in facial contour therewith and to the forward edges of the mold-boards as shields preventing any over-flow of earth above the mold-boards, spouts for fertilizer coming at either side of said disk-wheel cutter rearward of the mold-boards, a divided spout above the aforesaid spouts adapted to receive fertilizer from a suitable distributer so as to deliver the same in a furrow made by the mold-boards and at either side of the disk-wheel cutter.

Signed by me this 27th day of May, 1911.

LEWIS AUGUSTUS ASPINWALL.

Witnesses:
C. G. ROWLEY,
GEO. N. WHITNEY.

---

Copies of this patent may be obtained for five cents each, by addressing the "Commissioner of Patents, Washington, D. C."